United States Patent [19]

Lesea

[11] Patent Number: 5,315,214
[45] Date of Patent: May 24, 1994

[54] DIMMABLE HIGH POWER FACTOR HIGH-EFFICIENCY ELECTRONIC BALLAST CONTROLLER INTEGRATED CIRCUIT WITH AUTOMATIC AMBIENT OVER-TEMPERATURE SHUTDOWN

[75] Inventor: Ronald A. Lesea, Redwood City, Calif.

[73] Assignee: Metcal, Inc., Menlo park, Calif.

[21] Appl. No.: 896,152

[22] Filed: Jun. 10, 1992

[51] Int. Cl.[5] .............................. H05B 37/02
[52] U.S. Cl. ............................. 315/209 R; 315/307; 315/308; 315/291; 315/224
[58] Field of Search ............. 315/219, 224, 283, 291, 315/307, 308, 209 R, DIG. 4; 320/64; 307/66, 80

[56] References Cited

U.S. PATENT DOCUMENTS

| | | | |
|---|---|---|---|
| 4,384,213 | 5/1983 | Bogel | 307/80 |
| 4,415,839 | 11/1983 | Lesea | 315/308 |
| 4,629,967 | 12/1986 | Voss | 320/64 X |
| 4,988,889 | 1/1991 | Oughton, Jr. | 307/66 |
| 5,204,587 | 4/1993 | Mortimor et al. | 315/308 |

Primary Examiner—Robert J. Pascal
Assistant Examiner—Haissa Philogene
Attorney, Agent, or Firm—Thomas E. Schatzel

[57] ABSTRACT

An embodiment of the present invention is a dimmable, high power factor, high efficiency electronic ballast comprising, on a single integrated circuit chip, a shunt regulator, a voltage reference, a high-temperature shutdown, an undervoltage lockout, a timer for start-up and restarting, a variable oscillator, a mode control, an op-amp for receiving a signal proportional to lamp current and for controlling the variable oscillator or the duty-cycle of pulses output in a closed-loop servo, and active power factor correction including an analog multiplier for receiving an AC voltage and an AC current sample, and for multiplying these together to result in a comparison with a DC voltage. The comparison produces a control signal for a MOSFET switch on a boost converter transformer that actively corrects the power factor at a rate set by the oscillator.

16 Claims, 5 Drawing Sheets

DIMMABLE HIGH POWER FACTOR HIGH-EFFICIENCY ELECTRONIC BALLAST CONTROLLER INTEGRATED CIRCUIT WITH AUTOMATIC AMBIENT OVER-TEMPERATURE SHUTDOWN

BACKGROUND OF THE INVENTION

1. Field of the Invention

The present invention relates generally to ballasts for gaseous-discharge lamps, such as fluorescent lamps, and more specifically to a dimmable, high power factor, high efficiency electronic ballast with a single integrated circuit semiconductor controller chip.

2. Description of the Prior Art

Incandescent lamps have provided electric light for streets, homes and offices for over a century. They provide a safe light that has no open flame, and produce no soot as did their predecessor gas lamps. More efficient, albeit initially more expensive, lighting systems are now supplanting incandescent lamps. Fluorescent lamps, a type of gas discharge lamp, require about one-third, or less, the electrical power of an incandescent lamp to produce the same light output.

Unlike incandescent lamps which are self-limiting as a result of their positive-resistance characteristic, gaseous-discharge lamps have a negative-resistance characteristic and are not self-limiting. For this reason, gaseous-discharge lamps are operated in conjunction with a ballast which provides the requisite current limiting. Traditionally, the construction of ballasts have included cores and coils. One form is that of a simple choke which provides an inductive impedance for current limiting. Another form includes a transformer. The transformer form permits voltage conditioning and provides a high break-down potential which is required for starting most fluorescent lamps by ionizing the enclosed gas to a plasma. For rapid-start-type fluorescent lamps, a pair of windings are included in the transformer for energizing the lamp filaments and, separate from the filaments windings, a high-voltage winding having a high reactance for current limiting. Alternatively, a magnetic shunt may be included in the transformer to limit the energy transferred through the magnetic path.

Unfortunately, traditional core-and-coil-type ballasts are relatively inefficient due to substantial heat generating losses that are generally equally divided between copper losses in the coil and core losses in the relatively inexpensive grades of iron employed therein. For example, it is not unusual for a traditional core-and-coil-type ballast employed in a dual forty-watt lamp fixture to dissipate from fifteen to twenty watts, causing the ballast to run hot to the touch. Further, in many applications, such as in office buildings, this ballast-generated heat must be removed by air conditioning equipment which is itself relatively inefficient. Another problem is that core-and-coil-type ballasts are relatively heavy requiring that associated fixtures be more substantial than would otherwise be necessary.

The regulation afforded by traditional core-and-coil type ballasts is also relatively poor. Typically, the operating level of fluorescent fixtures employing such ballasts varies as much as the square of the power-line voltage. Thus, in many applications, excessive lighting, dissipating excessive power, is often employed to insure that minimum lighting levels are achieved.

Among other problems associated with gaseous-discharge lamps is that they are less efficient when operated at the normal sixty Hz line frequency than when they are operated at higher frequencies. Fluorescent lamps are often difficult to start when cold and, as a result, may flicker for a time. Fluorescent lamps require core-and-coil-ballast lead-lag phasing both to reduce stroboscopic effects and to increase the power factor such lamps present to the line via the ballast.

Electronic ballasts and networks for gaseous discharge lamps are described in the following United States Patents which were issued to the present inventor, Ronald A. Lesea: U.S. Pat. No. 4,415,839, issued Nov. 15, 1983; U.S. Pat. No. 5,047,691, issued Sep. 10, 1991; and U.S. Pat. No. 5,101,140, issued Mar. 31, 1992.

Gaseous discharge lighting systems can load a commercial AC electrical power supply in such a way that current demand is increased and distorts an otherwise sinusoidal voltage waveform. Watt meters, used for billing purposes, do not see this increase, and the load inappropriately burdens the electric company supplying power. Other users on the same grid can be adversely affected by the distorted waveform, and the problem becomes very serious when such lighting systems are used exclusively in large high-rise office buildings. It has therefore become a requirement of ballasts to include some power factor correction (PFC). Such PFC should preferably also include a means for eliminating any potential runaway condition that can result during load removal, and have low total harmonic distortion (THD).

It is common to install wall dimmers that work with ordinary incandescent lamps. However, ordinary wall dimmers do not properly function with ordinary fluorescent lights. In fact, many fluorescent light fixtures structured to screw directly into a socket for a 120 volt household incandescent light carry consumer warnings not to use the fluorescent lamp with the dimmer. Dimmable fluorescent lights are not familiar to most consumers, even though such systems have been available from limited sources in the last few years.

One significant advantage of fluorescent lamps is their comparative long life. The long life is a substantial factor in the computation of whether or not fluorescent lighting systems are cost effective compared to ordinary incandescent lights. The cost of a fluorescent lamp tube is much higher than that of an incandescent lamp bulb. It is therefore imperative that a ballast does not reduce the intrinsic life of the fluorescent tubes it powers. One way to do that is to properly heat the filaments in the ends of the fluorescent tubes before and during the application of high voltage for starting.

A particular difficulty to consumers, presented with the failure of a fluorescent lamp tube, is determining which tube has failed. Many ballasts are such that if one tube fails, all the tubes go dark. Compounding the problem, some ballasts maintain the application of full power and do not properly manage filament power. What started as a simple failure of one tube, can compound into the premature failure of one or more other tubes in the system. Therefore, a ballast is now needed in the industry that protects the remaining good tubes when only one tube fails.

The heat that has been traditionally generated by ballasts has prompted various standards testing and underwriting laboratories to issue a requirement that ballasts have some kind of over-temperature shut-down. A prior art approach to sense an over-temperature condition of the ambient within a ballast has been to use a separate heat sensor and controller. What is needed in order to reduce costs and improve reliability is an integrated, on-board heat sensor that senses the heat of the ambient that soaks into the controller.

SUMMARY OF THE PRESENT INVENTION

It is therefore an object of the present invention to provide an electronic ballast that has power factor correction, dimming control, programmable restart and over-temperature shutdown on a single integrated circuit.

Briefly, an embodiment of the present invention is a dimmable, high power factor, high efficiency electronic ballast comprising, on a single integrated circuit chip, a shunt regulator, a voltage reference, a high-temperature shutdown, an undervoltage lockout, a timer for start-up and restarting, a variable oscillator, a mode control, an op-amp for receiving a signal proportional to lamp current and for controlling the variable oscillator or the duty-cycle of pulses output in a closed-loop servo, and active power factor correction including an analog multiplier for receiving an AC voltage and an AC current sample, and for multiplying these together to result in a comparison with a DC voltage. The comparison produces a control signal for a MOSFET switch on a boost converter transformer that actively corrects the power factor at a rate set by the oscillator.

An advantage of the present invention is that it provides an electronic ballast chip that has power factor correction and dimming ballast control in one chip.

Another advantage of the present invention is that it provides an electronic ballast chip that has low distortion, high efficiency continuous boost power factor correction.

A further advantage of the present invention is that it provides an electronic ballast that has a high temperature shutdown feature.

Another advantage of the present invention is that it provides an electronic ballast chip that has programmable start scenarios for rapid start and instant start lamps.

These and other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENTS

Figure 1:
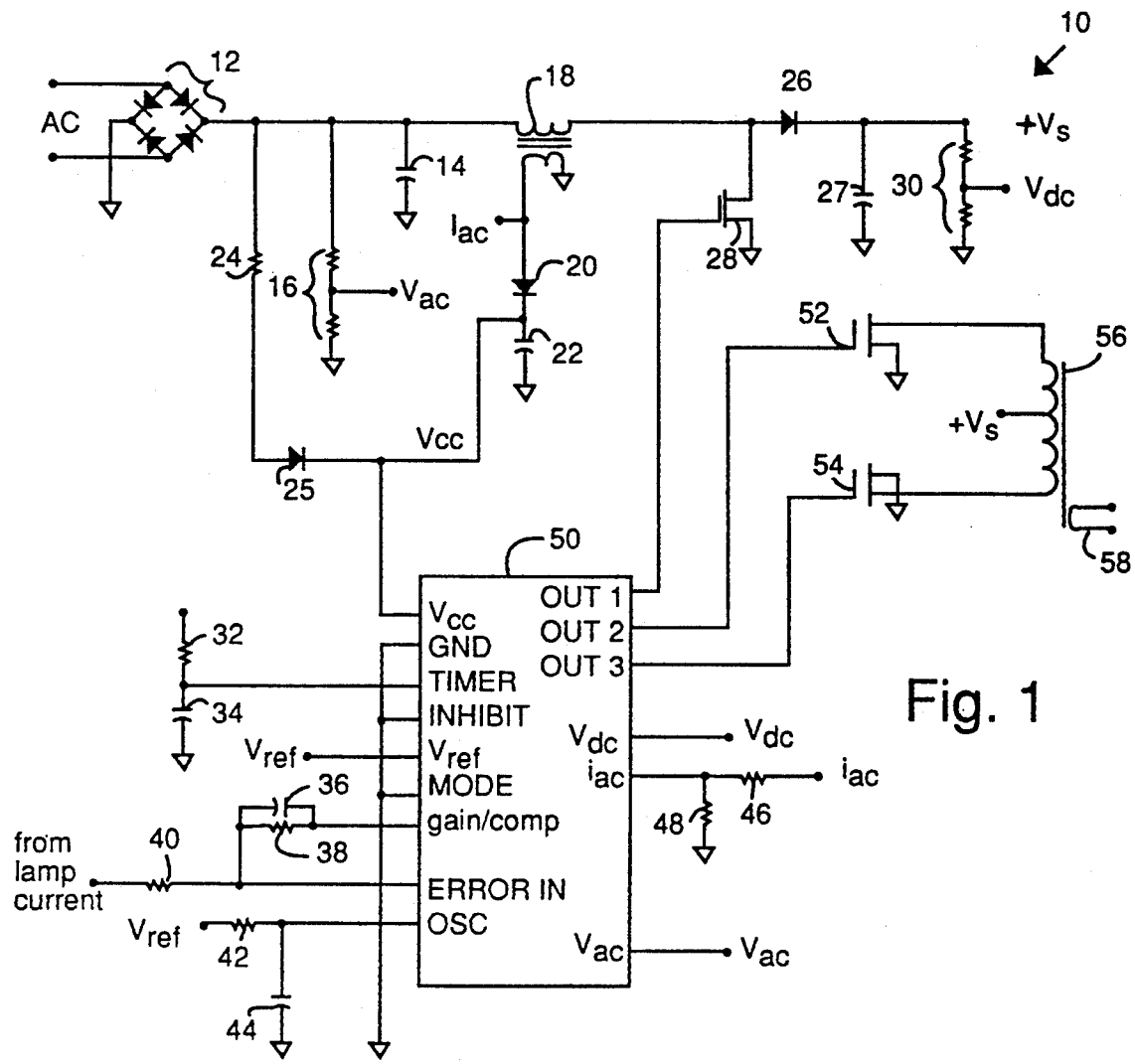
FIG. 1 is a schematic diagram of a boost converter in a first embodiment of the present invention that uses a center-tapped output transformer.

FIG. 1 illustrates a boost converter 10, in an embodiment of the present invention, which comprises a full-wave bridge rectifier 12, a filter capacitor 14, a voltage divider 16 that produces a sample voltage "$V_{ac}$" for power factor correction, a transformer 18 that similarly produces at its secondary a voltage, representing a current "$i_{ac}$" that is proportional to the current through the primary of transformer 18 and is a sample used for power factor correction. A supply voltage "vcc" is provided by a diode 20, a filter capacitor 22, a dropping resistor 24 and a diode 25. Resistor 24 is chosen to limit the current supplied through diode 25. A supply voltage "+Vs", used by a network and a load comprising at least one gaseous discharge lamp, is developed by a diode 26 and a filter capacitor 27. A power factor correction MOSFET 28 is used to periodically short the output of the primary winding of transformer 18 to circuit common. The period of such a short must be necessarily limited in duration to achieve the desired active power factor correction inductive boost in the primary of transformer 18 and not destroy the transformer and/or MOSFET.

A sample of voltage +Vs, labeled "Vdc", is produced by a voltage divider 30 and is the third component input used for power factor correction. A timing resistor ($R_{t1}$) 32 and a timing capacitor ($C_{t1}$) 34 set the basic start-up delay, or filament warm-up time. A gain compensation capacitor 36, a gain compensation resistor 38 and an input resistor 40 setup the gain characteristics of an op-amp that monitors current through the lamp load. A simple dropping resistor (not shown) may be used in series with the lamp load in a conventional way to sample lamp current. A base clock frequency of an oscillator is determined by a resistor ($R_{t2}$) 42 and a capacitor ($C_{t2}$) 44. The frequency chosen is such that the network will be stimulated with pulses of voltage +Vs at a frequency for which the network produces voltages great enough to operate the lamps in the load. The frequency at which MOSFET 28 operates is determined by the base clock frequency and the pulse duration at the gate is modulated to effectuate active power factor correction. A pair of resistors 46 and 48 divide down sample current $i_{ac}$ for a ballast chip 50. Sample voltage $V_{ac}$ and $i_{ac}$ are multiplied together in chip 50 and compared to sample voltage $V_{dc}$. The result is the degree of power factor correction required. A pair of MOSFET transistors 52 and 54 are driven at their respective gates by chip 50 such that an alternating current is produced in the primary of a transformer 56. A winding 58 supplies filament voltage to the load lamps.

Transformer 56 is typically driven by chip 50 via MOSFETs 52 and 54 at a first frequency that produces a filament current in winding 58 and then at a second frequency that operates with transformer 56 and the network and load to produce ionizing voltages in the load lamps. Chip 50 regulates the current through the load lamps by adjusting the frequency and/or duty cycle of the gate drive signals applied to MOSFETs 52 and 54. Resistor 32 and capacitor 34 set a filament heating time period in chip 50 that adjusts the delay time before high voltage is applied across the lamps. This delay helps ensure the life of lamps. Resistor 42 and capacitor 44 set a resistor-capacitor (RC) time constant for an oscillator within chip 50 that determines the base frequency of operation.

Figure 2:
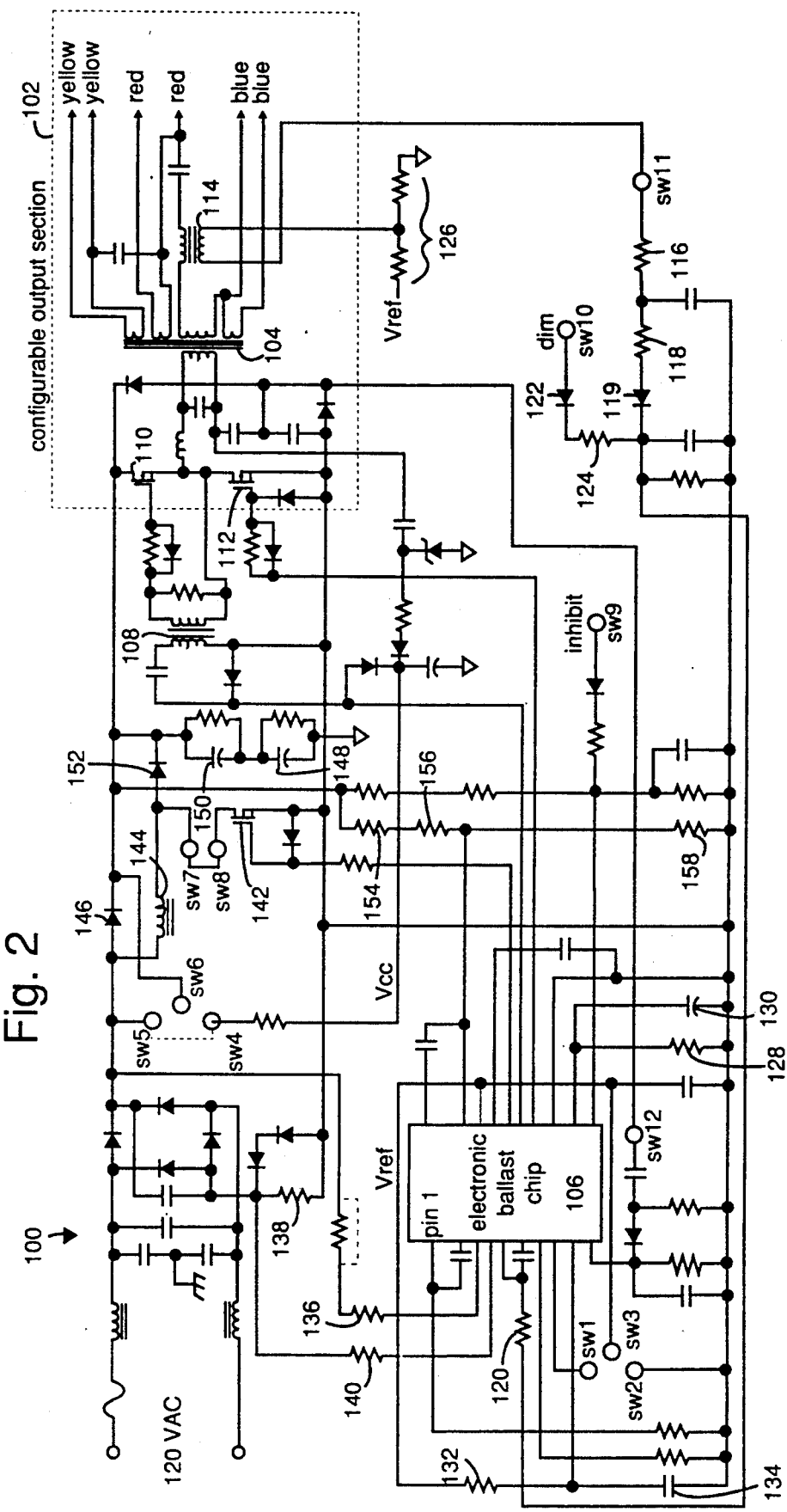
FIG. 2 is a schematic diagram of a lighting system in a second embodiment of the present invention that uses two transistors in a half-bridge.

FIG. 2 illustrates a system 100 that includes a configurable output section 102. An output transformer 104 has four secondary windings and is part of a network that can be adapted to suit a variety of lamp types and configurations. An electronic ballast chip 106 is similar to ballast chip 50, and much of the functional operation within system 100 is therefore the same. The pinout of ballast chip 106 is described in more detail by Table I. A transformer 108 is used to DC isolate ballast chip 106 from the gate of a high-side MOSFET 110 that must necessarily operate near a high voltage +Vs. A second MOSFET 112 and MOSFET 110 are similar in function to MOSFETs 54 and 52 (FIG. 1). Transformer 104 does not have a center-tapped primary as does transformer 56 in FIG. 1, and therefore transformer 104 must be driven in a way that develops the AC currents from a single voltage +Vs. Current through the gaseous discharge lamp load (not shown, but attached to section 102) is sampled by a transformer 114. A voltage proportional to the lamp load current is returned via a series of resistors 116 and 118, a diode 119 and a resistor 120 to ballast chip 106, and is referred to herein as "Isense". A current injected via a diode 122 and a resistor 124 will modify the value of "I SENSE" and has the effect of a dimming control. The basic level of operation, e.g. the level of lamp load current, is established by a voltage injected into transformer 114 by a voltage divider 126 connected to a voltage reference "Vref". A timer resistor 128 and a capacitor 130 set the preheat and lamp-out-of-socket interrupt period for a timer within chip 106. A resistor 132 and a capacitor 134 similarly setup the basic frequency period of an oscillator included in chip 106. A full-wave rectified input voltage is sampled by ballast chip 106 for power factor correction through a resistor 136. The input current is detected by dropping it across a resistor 138 and feeding the resultant voltage through a resistor 140 to ballast chip 106. The inputs necessary for power factor correction are combined within ballast chip 106 and used to modulate a control signal applied to the gate of a boost MOSFET 142. The input current coupled through resistor 140 is forced to follow the voltage coupled through resistor 136 by switching a boost inductor 144 periodically to circuit common through MOSFET 142. A diode 146 allows surge bypass around boost inductor 144 to a series combination of a pair of capacitors 148 and 150. A diode 152 isolates capacitors 148 and 150 from boost inductor 144 and prevents the charge on the capacitors from discharging through MOSFET 142. For a 120 volt alternating current (VAC) input, the voltage across capacitors 148 and 150 will be about 250 volts. A sample of this voltage, referred to as $V_{dc}$, is divided by a set of resistors 154, 156 and 158 and input to ballast chip 106 for the purpose of regulating Vdc.

Table I lists the pinouts and pin numbering of ballast chip 106. Chip 50 has a different pin configuration. In FIG. 2, pin number "1" is identified on chip 106 and the numbering progresses counter-clockwise. The semi-standard tile array methodology of Micro Linear Corporation (San Jose, Calif.) has been used successfully and may be used to provide customized versions optimized to specific ballast architectures. A system using such a chip is capable of power factors better than 0.99 with low input current total harmonic distortion (THD) at better than 95% efficiency.

TABLE I

| pin no. | pin symbol | function |
|---|---|---|
| 1 | IA− | Inverting input of the power factor correction average current error amplifier. |
| 2 | IA OUT | Output and compensation node of the power factor correction average current error amplifier. |
| 3 | I(SINE) | Power factor correction current multiplier input. |
| 4 | IA+ | Non-inverting input of the power factor correction average current error amplifier. A negative current sense signal may be used on Pin 4 in place of a positive input on pin 1. |
| 5 | LAMP FB | Inverting input of lamp arc current error amplifier and input node for dimmer control. Dimming is accomplished by summing additional current to this pin. |
| 6 | LAMP FB OUT | Output of lamp current error amplifier and lamp current loop compensation. |
| 7 | R(SET) | Oscillator Fmax, multiplier max Iout, and Cx charging current set by an external resistor to circuit common. |
| 8 | MODE | Controls lamp current error amp and preheat timers and choice amongst two variable frequency and one pulse width modulation mode. Connecting this pin to circuit common allows variable frequency control. Leaving pin 8 open increases the oscillator discharge current to 35.0 mA. Connecting Pin 8 to Vref allows variable underlapping pulse width control. Dead time between output pulses is provided in both modes. |
| 9 | Rt, Ct | Oscillator timing components. The oscillator frequency is insensitive to temperature, chip to chip variations, etc., and determined only from the values of Ct and Rt. Desirable range of values are 360 picofarads to ten nanofarads for Ct and 4.7K ohms to 100K ohms for Rt. During the initial VCO mode start period (0.7 seconds) an oscillator current source of 96 microamperes is connected to pin 9, at the end of this period a current source of zero to 192 microamperes is activated. |
| 10 | INTERRUPT | A voltage greater than Vref resets the chip and causes a restart after a delay of three times the start interval (used for lamp-out detection and restart). |
| 11 | OVP/INHIBIT | The power factor correction output is inhibited when this pin exceeds five volts; the chip function is inhibited and is reset when this pin exceeds 6.8 volts. |
| 12 | Rx/Cx | A capacitor connected to this pin sets the basic timing for the preheat, dimming lockout and interrupt functions. A capacitor to circuit common from this pin provides a delay period at turn-on to lockout certain chip 300 functions that can interfere with proper lamp starting. The delay period is nominally two seconds. After starting and lamp out detection, Rx sets the interval between restart attempts. |
| 13 | GND | Chip circuit common. |
| 14 | OUT B | Ballast MOSFET drive output. Pins 14 and 15 are opposite phase outputs for the gate drives of the two output inverter power MOSFETs. |
| 15 | OUT A | These outputs preferably should not cause latching or chip 300 malfunction if the pin is driven above Vcc or below circuit common. The frequency of the gate drives is one half that of the master |

TABLE I-continued

| pin no. | pin symbol | function |
|---|---|---|
| | | oscillator. |
| 16 | PFC OUT | This is the gate drive output for the active power factor boost converter power MOSFET. This output preferably should not cause latching or chip 300 malfunction if the pin is driven above Vcc or below circuit common. The frequency of the gate drive is the same as that of the master oscillator. |
| 17 | +Vcc | Vcc positive power supply for the chip. This pin has an internal shunt regulator to circuit common, with a nominal value of 13.5 volts ± 5%. Associated with the shunt regulator is the Vref circuit, under-voltage lockout, start-up hysteresis and chip 300 bias circuitry. Chip 300 should draw minimal current until after the voltage on pin 17 rises above the start-up voltage, which is 0.5 to one volt less than the shunt regulating value. |
| 18 | Vref | Buffered output to provide a stable voltage reference derived from an internal bandgap reference. |
| 19 | EA− | Inverting input to the power factor correction error amplifier for sensing and regulating the boost converter output DC voltage. The non-inverting input is internally connected to Vref. |
| 20 | EA OUT | Power factor correction error amplifier output and compensation node. |

Figure 3:
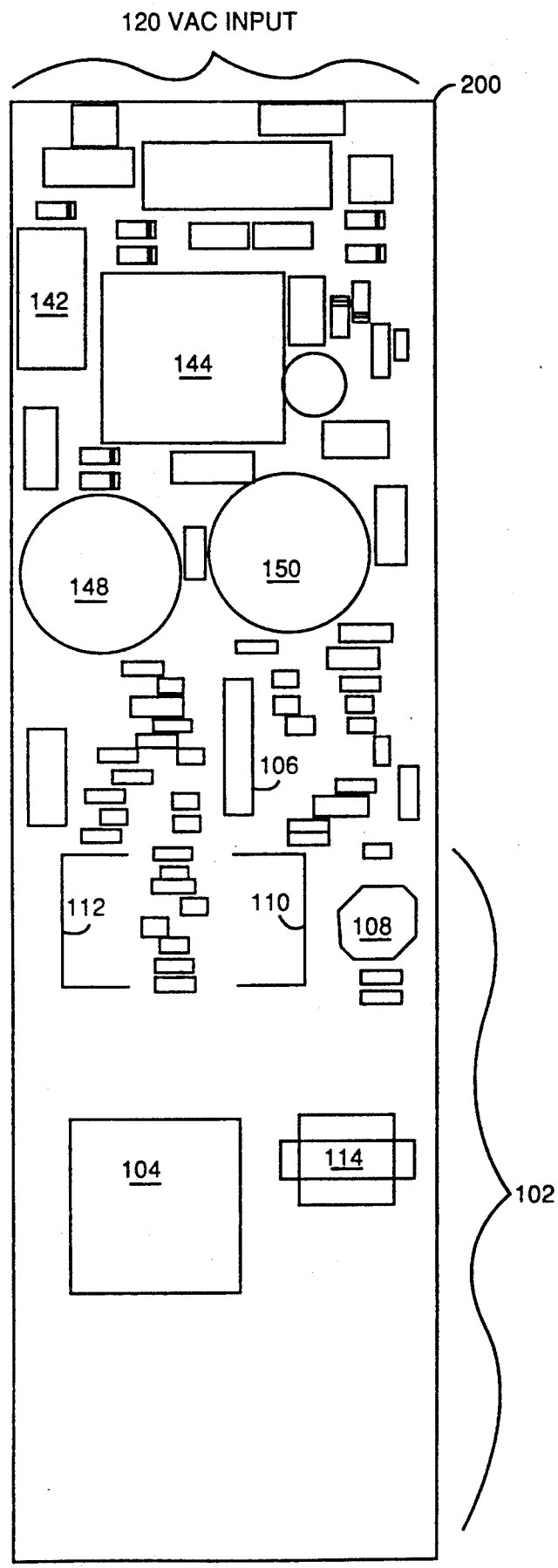
FIG. 3 is a top elevational view of the printed circuit board assembly for the lighting system of FIG. 2.

A printed circuit board assembly (PCBA) 200 is illustrated in FIG. 3 and represents one way that the components of system 100 may be arranged successfully. Other layouts are possible. Component locations are identified on PCBA 200 by using their element numbers of FIG. 2. The layout of FIG. 3 has been configured to demonstrate the versatility of chip 106 to potential users.

Figure 4:
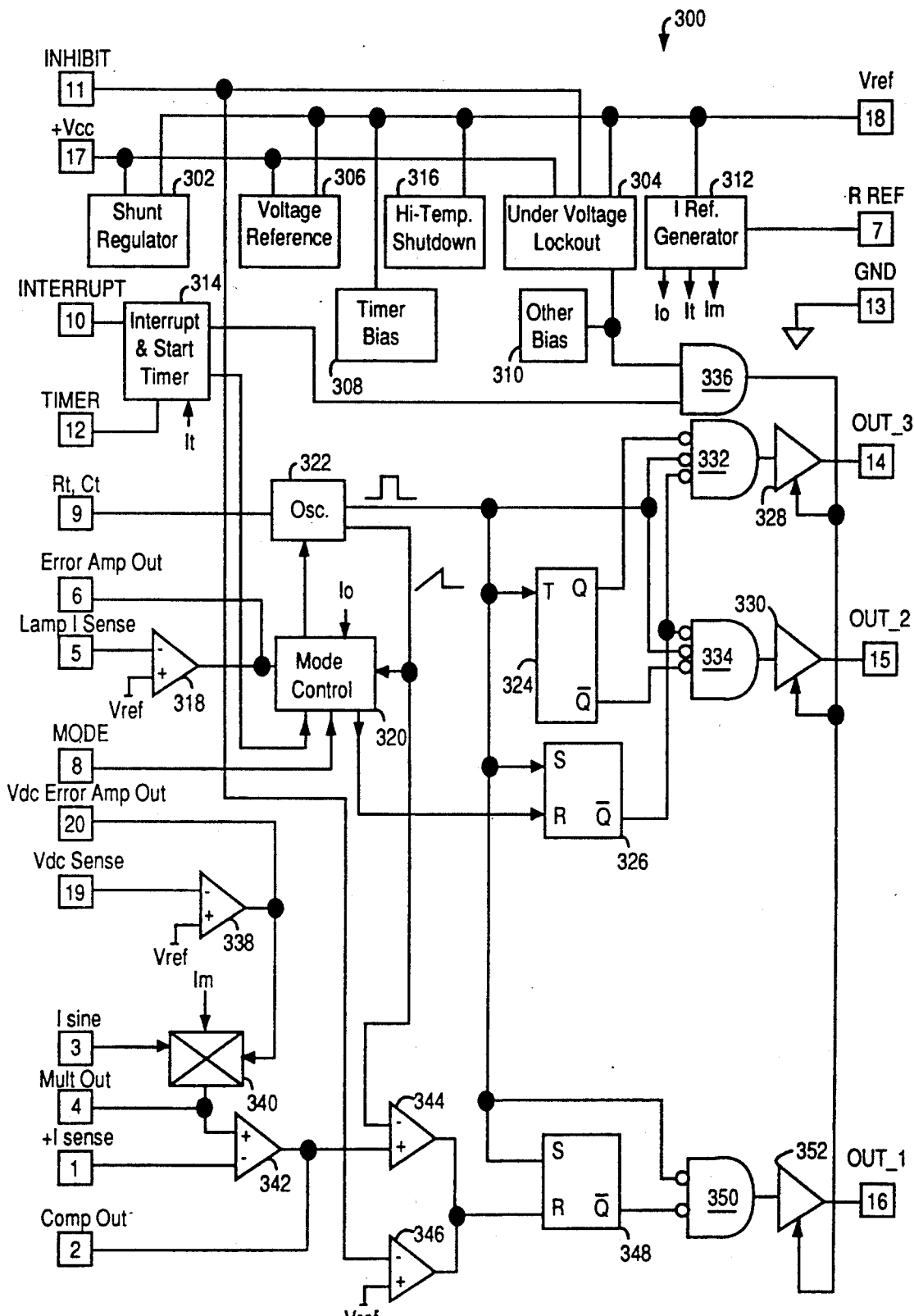
FIG. 4 is a functional block diagram of an electronic ballast chip in a third embodiment of the present invention.

FIG. 4 illustrates a chip embodiment of the present invention, and is referred to by the general reference numeral 300, and is functionally similar to ballast chips 50 and 106. Chip 300 may be fabricated with a conventional low voltage (10 V–20 V) bipolar process and has a die size that may be expected to be approximately one hundred mils square. A shunt regulator 302 maintains a 13.5 volt level within chip 300 and is fed with an external current source at a pin labeled +Vcc. If a series regulator were used instead, it would dissipate substantially more power than does shunt regulator 302, and so it would be less efficient and contribute to the unnecessary heating of chip 300. Shunt regulation prevents a condition where twenty-five volts or more could appear on chip 300. An undervoltage lockout 304 prevents chip 300 from operating during low line voltage situations, such as brown outs, and which are reflected in low levels of +Vcc. As gaseous discharge lamps in the output network driven by chip 300 starve for current, a short lamp life condition can develop. Undervoltage lockout 304 prevents such operation by effectively turning chip 300 off.

At lower than normal operating voltages, many semiconductor chips begin to operate erratically and are unreliable. Digital logic thresholds shift, biases change and, under extreme conditions, power output devices can be destroyed if not protected. It may also develop that some outside condition or a user may need to turn chip 300 off. An outside line, labeled INHIBIT, is used externally to force off the rest of chip 300, the same as if an undervoltage condition was present. Preferably, undervoltage lockout 304 has a hysteresis circuit that operates, for example, at ten and twelve volts.

Chip 300 further includes a voltage reference (Vref) 306 that may either be five volts or 7.5 volts or any other convenient voltage. The object is to derive a stable reference voltage that can be used in the other threshold sensitive circuits of chip 300. Undervoltage lockout 304 requires that Vref assume a proper level, otherwise it will disable chip 300. A timer bias control 308 and an "other" bias control 310 supply internal current mirrors and other biasing that prevents operational drifts with changes in chip 300 temperature. A current reference generator 312 supplies a set of constant current sources for an oscillator ("Io"), a timer ("It") and an analog multiplier ("Im"). These constant current sources allow timing resistors and capacitors to both be tied from a pin on chip 300 to circuit common, rather than tying the resistor as a pull-up to +Vcc or Vref, as are resistors 32 and 42 in FIG. 1. A pin labeled "R REF" allows current reference generator 312 to be programmed with an external resistor to circuit common. A timer 314 has an external resistor and capacitor (Rt and Ct) that set the time period that the lamp filaments in an output load are allowed to heat before the full voltage is applied across them. Lamp life will be improved if the warm-up, or start-up time is sufficiently extended, e.g., 0.6 to 0.7 seconds. In an instant-start lamp application, chip 300 can accommodate a filament warm-up time of zero by the simple elimination of capacitor Ct, or by a resistor of sufficient value in series with Ct. A high temperature shutdown 316 senses heat that has soaked into chip 300 from the outside ambient air. Ballast operation will be suspended in the temperature sensed (the junction temperature) exceeds, for example, 100° or 120° Celsius (C). The die temperature of chip 300 is as follows in equation (1):

$$T_j \approx T_A + \left(P_D \times \frac{65° \text{ C.}}{W}\right) \quad (1)$$

Heat sources on chip 300 itself are normally relatively insignificant and have no substantial masking effect on the operation of high temperature shutdown 316. Instead, these sources act as an offset. The thermal resistance of chip 300 to its package and to the ambient is about normal for a twenty-pin plastic DIP giving a 20° C. junction temperature rise. High temperature shutdown 316 is able to perform its job satisfactorily because a shutdown is required only after the ambient has exceeded a predetermined maximum for typically thirty minutes, which is more than enough time for the heat to soak into chip 300 and to equalize across the thermal resistance of the package and chip 300 junction. (For example, Underwriters Laboratories, Inc., defines a slow rise, abnormal test, which is 110° C. for a half an hour.) The actual temperature sensing element within shutdown 316 may comprise a string of diodes in series in a conventional configuration. A "$V_{be}$" amplifier may also be used as a two terminal device to sense temperature. High temperature shutdown is effectuated by forcing the drive outputs of chip 300 off. The on-chip heat dissipation of chip 300 which acts as an offset can be used to vary the thermal trip point of the high temperature shutdown 316. If more or less constant current is pumped into shunt regulator 302, the thermal trip point will be modulated accordingly.

Timer 314 sets the time period in which a lamp network that has been detected as being off is put through an attempt to restart, for example every two seconds. Preferably, in order to decrease the number of pins involved and the number of parts needed, timer 314 is a single dual-threshold type that uses a common resistor-capacitor set and different triggering thresholds to extract double duty operation. One time period is used for start-up timing and the other for lamp-out-of-socket interrupt timing. The implementation details of the dual-threshold timer are not necessary to describe herein, because such devices are conventional. An error op-amp 318 amplifies a "LAMP I SENSE" signal derived from a lamp current sensing circuit in the output load. A closed-loop servo is implemented thereby establishing a control point that stabilizes lamp current and brightness. A modification of the control-point can vary lamp brightness and thereby behave as a dimming control. A mode control 320 steers the output of op-amp 318 according to the state of a signal on a "MODE" input. A variable oscillator 322 operates at a variety of frequencies, depending on the values of an external resistor and capacitor combination and the constant current source "Io". In a frequency control mode, the constant current source "Io" is modified by op-amp 318 and steered to oscillator 322 such that its output frequency may be affected. In a pulse width control mode, the output of op-amp 318 is used to produce a reset signal that turns off a flip-flop, which has been turned on periodically by oscillator 322. In alternative embodiments of the present invention, one of a fixed frequency mode or a pulse width mode may be alternatively configured, and thereby eliminate the need for mode control 320. Oscillator 322 outputs both a square wave signal and a sawtooth signal.

A typical operating frequency for oscillator 322 is eighty kilohertz, which produces a frequency of forty kilohertz in the lamp load. The minimum lamp frequency is preferably greater than twenty kilohertz, in order to keep it above the range of human hearing. Above 120 kilohertz, radio frequency emissions could become a problem and the rules of the Federal Communications Commission become a constraint.

Oscillator 322 does not "slow-start" by ramping between frequencies, as is common in the prior art. During start-up, which is also referred to as pre-heat, timer 314 signals oscillator 322 via mode control 320 to run at a frequency or pulse width that does not produce ionizing voltages in the output load but does develop filament current. A dimming control signal is accomplished with a current that is injected into the RC network. The exact frequency or pulse width necessary during start-up is a function of the output network and types of lamps used. A T-type flip-flop 324 toggles at half the frequency of oscillator 322 and produces the complementary digital output signals for a pair of MOSFET gate drives labeled "OUT_3" and "OUT_2". A reset-set (RS) flip-flop 326 enables both MOSFET gate drives to be controlled by the complementary outputs of flip-flop 324. For variable pulse width mode, the RS flip-flop 326 terminates the output pulses to both MOSFET gate drives, effectively disabling them, when the sense current (LAMP I SENSE) from op-amp 318 exceeds a threshold labeled "Vref", which is derived from voltage reference 306. A set signal arrives at flip-flop 326 from oscillator 322 each period. A reset signal arrives later each period from op-amp 318 via mode control 320. The effect is a fixed frequency, pulse width modulated closed-loop servo control of lamp current. The choice of variable frequency mode and variable pulse width mode allows a ballast designer a great deal of flexibility in the choice of output networks and lamps that can be used with chip 300. The current necessary for MOSFET gate drive is provided by a pair of buffers 328 and 330. The logic necessary to translate the outputs of flip-flops 324 and 326 to MOSFET gate drives OUT_3 and OUT_2 is provided by a pair of gates 332 and 334. A gate 336 controls an output enable control on buffers 328 and 330, and can effectively turn off the output from chip 300 by inhibiting OUT_3 and OUT_2.

Chip 300 includes an active power factor correction feature that forces the input AC current to be sinusoidal. The theory and application of average current mode power factor correction controllers is described in detail by Mehmet K. Nalbant and William Cho in Application Note 16, "Theory and Application of the ML4821 Average Current Mode PFC Controller", published by Micro Linear Corporation (San Jose, Calif.), January 1992. Chip 300 uses a PFC configuration similar to that shown in FIG. 2 of the Nalbant & Cho application note. An op-amp 338 operates as an error amplifier in a voltage control loop and receives at its inverting input a sample of the voltage output by the boost converter. In FIG. 1 this point is at the top of divider 30. The inverting input is connected to a pin labeled "VDC SENSE". An analog multiplier 340 receives the signal from op-amp 338 and a current at a pin labeled "I SINE" that is proportional to the voltage of a full-wave rectified sinewave. The control objective is to force the input current waveshape to follow the shape of the input voltage, and thereby correct the power factor to approach unity. It does this by modulating the duty cycle of a boost MOSFET driven at its gate by a pin labeled OUT_1. Multiplier 340 has its output connected to a pin labeled "MULT OUT" and to the non-inverting input of an op-amp 342. A sample of the input current waveform is injected as a current into the non-inverting input of op-amp 342 via the MULT OUT pin. FIG. 2 shows this being done with resistor 140. The current through the load produces a voltage drop across resistor 138 that is proportional to the input current.

Figure 6:
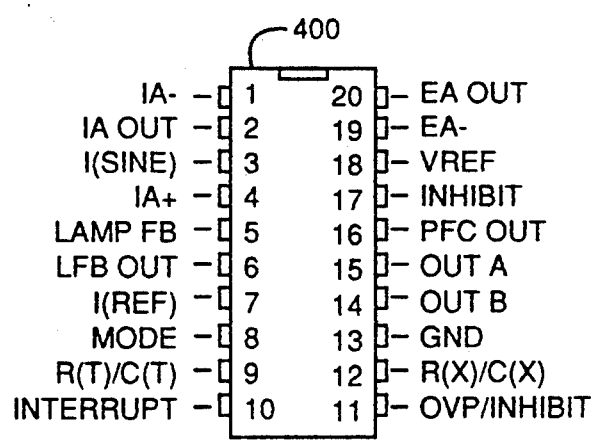
FIG. 6 is a top elevational view of the package for the electronic ballast chip of FIG. 5.
Figure 5:
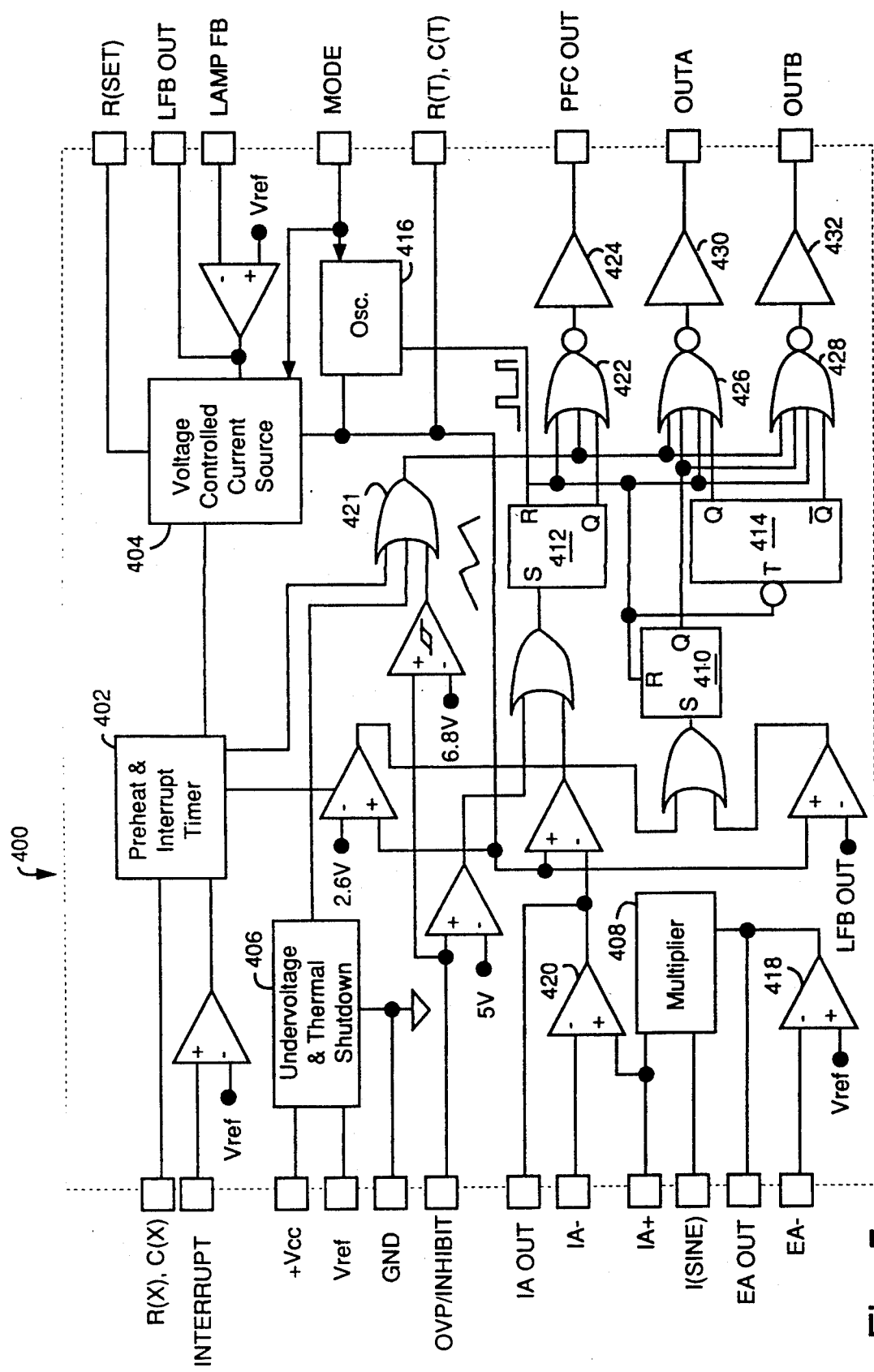
FIG. 5 is a functional block diagram of an alternative electronic ballast chip in a fourth embodiment of the present invention and is similar to that of FIG. 4.

FIGS. 5 and 6 illustrate an alternative embodiment of an electronic ballast chip, according to the present invention, and referred to by the general reference number 400. Ballast chip 400 is similar to ballast chip 300 in several major respects. Some functions have been combined and others added. A few of the functional terms are different and reflect the range the individual functions can assume. Ballast chip 400 comprises a preheat and interrupt timer 402, a voltage controlled current source 404, an undervoltage and thermal shutdown 406, a linear current input multiplier 408, a pair of RS flip-flops 410 and 412, a T-type flip-flop 414 and an oscillator 416. The timing for preheat, dimming lockout and interrupt are set by a resistor-capacitor combination connected externally to the pin labeled "R(X)/C(X)", e.g., resistor 128 and capacitor 130 in FIG. 2. An external resistor connected between the pin labeled "R(SET)" and circuit common fixes the maximum frequency Fmax of oscillator 416, the Iout of multiplier 408 and the charging current directed to R(X)/C(X). The output of multiplier 408 is a current which appears on the "IA+" pin to form the reference for a current error amplifier (EA) 418. The multiplier 408 output current is converted into the reference voltage for a current amplifier (IA) 420 through a resistor to circuit common. A pin labeled "MODE" sets the operating mode of chip 400 according to the logic shown in Table II.

TABLE II

| Operational MODE | MODE Input Pin | Definition |
|---|---|---|
| VCO | circuit common | wide range FM |
| VCO7 | open | narrow range FM |
| PWM | Vref | pulse width modulation |

The lamp feedback controls the two voltage controlled oscillator (VCO) ranges. As lamp current decreases, the charging current to C(T) decreases, thereby causing oscillator 416 to decrease in frequency. Since the ballast output network acts as a high pass filter, the power to the lamps will be increased. For chip 400 to be effectively used in dimming ballasts with higher-Q output networks, a larger C(T) value and a lower R(T) value can be used, to yield a smaller (narrower) frequency excursion over the control range of the LFB OUT pin. To keep the dead time appropriate, the discharge current is set to five milliamps in VCO mode and thirty-five milliamps in the VC07 mode.

The error amplifier 418 serves the same purpose as op-amp 338 and its associated pinouts are labeled "EA" rather than Vdc. The current sense amplifier (IA) 420 serves the same purpose as op-amp 342 and its associated pinouts are labeled "IA" rather than +I SENSE. Shutdown 406 combines both undervoltage and thermal protection and an inhibit signal is sent to a three-input OR-gate 421. Hysteresis is provided in both the undervoltage and thermal sensing to eliminate chattering of the inhibit signal that would otherwise result. Other input signals are received from timer 402 and over voltage and inhibit input (OVP/INHIBIT). When the voltage of the OVP/INHIBIT pin exceeds five volts, the PFC OUT pin is inhibited. When the voltage of the OvP/INHIBIT pin exceeds 6.8 volts, the PFC OUT, OUTA and OUTB output pins are inhibited, effectively turning chip 400 off. Power factor correction is communicated out of chip 400 by a three-input NOR-gate 422 and a buffer 424 to an output pin labeled "PFC OUT". This output is equivalent to OUT_1 in FIG. 4. A means must be provided to prevent a 100% on duty cycle from appearing at PFC OUT, otherwise the boost MOSFET and/or boost inductor can be destroyed. The prevention can be done by configuring oscillator 416 to never have a perfectly square output waveform (50% duty cycle). Another way is to provide a delay around flip-flop 412 that disables PFC OUT for some minimal time each clock period of oscillator 416. A pair of four-input NOR-gates 426 and 428 translate ballast MOSFET gate control signals from flip-flops 412 and 414 out through a pair of buffers 430 and 432 to output pins labeled "OUTA" and "OUTB". Chip 400 could be used in the system of FIG. 2 to replace ballast chip 106. Lamp feedback (LFB) is used to adjust current source 404 and therefore the behavior of oscillator 416. Pins labeled "LFB OUT" and "LAMP FB" are equivalent to pins labeled "Error Amp Out" and "Lamp I Sense" in FIG. 4.

The lamp starting scenario of chip 400 is preferably designed to maximize lamp life and minimize ballast heating during lamp out conditions. Timer 402 controls the lamp starting scenarios of filament preheat and lamp-out-of-socket (lamp out) interrupt. Capacitor C(X) is charged with a current set by source 404 and discharged through R(X). The voltage at C(X) is initialized to 0.7 volts (one Vbe) at power up. The time for C(X) to rise to 3.4 volts is the filament preheat time. During that time, the oscillator charging current will produce a high frequency (or low duty cycle) for filament pre-heat, but will not produce sufficient voltage to ignite the lamp. Gate drive outputs OUTA and OUTB are affected accordingly. After cathode heating, the inverter frequency or pulse width changes to a point that causes a high voltage to appear that will ignite (ionize) the lamp. If the voltage does not drop at a time when the lamp is supposed to have ignited, the lamp feedback voltage coming into the "LAMP FB" pin will rise above Vref. The C(X) charging current is shut off and the inverter is inhibited until C(X) is discharged by R(X) to a 1.2 volt threshold. By shutting off in this way, excessive heat generation is prevented when a lamp fails to strike or is out of socket. Function-reduced versions with fewer pins are also desirable in certain cost-sensitive and space-sensitive applications.

A suitable package for ballast chip 400 is the industry standard twenty-pin dual inline plastic package (DIP) with 0.3 inch spacing between pin rows, such as is shown in FIG. 6. The plastic, or molded DIP is also suitable for ballast chips 50, 106 and 300.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An integrated circuit (IC) for controlling a power factor correction (PFC) transistor and driving a pair of ballast transistors connected to a load network including a gaseous discharge lamp operable at a first frequency to cause filament heating in said gaseous discharge lamp and at a second frequency to generate ionizing voltages in said gaseous discharge lamp, the IC comprising:

a power supply voltage sampling input connected to receive a sample voltage $V_{ac}$ that represents the magnitude of voltage being delivered from a power supply source;

a power supply current sampling input connected to receive a sample current $i_{ac}$ that represents the magnitude of current being delivered from said power supply source;

a power factor correction circuit connected to the supply voltage sampling input and supply current sampling input and having a multiplier providing for an output of a product of a sample of a load voltage $V_{dc}$ and said $i_{ac}$ and a comparator for outputting a signal representing a difference between said product and said voltage $V_{ac}$;

a power factor correction output drive connected to the gate of said PFC transistor whose drain is connected to a boost inductor which is placed between said power supply source and said load network and which is responsive to said difference signal received from the power factor correction circuit;

at least one ballast transistor output drive each providing for a connection to a ballast transistor in said load network and having an output signal at said first and second frequencies and a modulated frequency for controlling a level of current flowing through said load network; and a timing circuit connected to alternate said output signal exclusively between said first and second frequencies and having an input control to adjust the duration of time said first operating frequency is initially engaged before proceeding to said second operating frequency, wherein a time sufficient to promote filament heating will elapse before and during an application of a high voltage for starting and maximizing the operating life of said gaseous discharge lamp.

2. The IC of claim 1, further including:

an over-temperature shutdown circuit connected to the ballast transistor output drive and having a temperature sensor integrated into and a part of the thermal mass of said IC and providing for a disabling of said ballast transistors whenever the heat that has soaked into the IC has exceeded a first limit as sensed by said temperature sensor.

3. The IC of claim 1, further including:

a dimming circuit connected to the ballast transistor output drive for varying the current through said load network by adjusting the frequency of said output signal according to an externally received dimming control signal.

4. The IC of claim 1, further including:

an oscillator including first and second frequency generation means connected to the ballast transistor output drive(s) for generating said first and second frequencies.

5. An integrated circuit (IC) for controlling a power factor correction (PFC) transistor and driving a pair of ballast transistors connected to a load network including a gaseous discharge lamp at a first frequency to cause a filament heating and at a second frequency to generate ionizing voltages in said gaseous discharge lamp, the IC comprising:

an over-temperature shutdown circuit having a temperature sensor integrated into and made an intrinsic part of the thermal mass of said IC and providing for a disabling of said ballast transistors whenever the heat that has soaked into the IC has exceeded a first limit as sensed by said temperature sensor.

6. A boost converter for operating a gaseous discharge lamp, comprising:

a load network including a gaseous discharge lamp and configured such that the application of power at a first frequency will cause a filament heating in said gaseous discharge lamp and the application of power at a second frequency will generate ionizing voltages in said gaseous discharge lamp;

a power factor correction (PFC) transistor connected to a boost transformer in series between a power supply source and the load network;

a pair of ballast transistors connected to switch power to said load network;

a power factor correction circuit connected to sample said power supply voltage ($V_{ac}$) and to sample said power supply current ($i_{ac}$) and having a multiplier to find a product of said sample $i_{ac}$ and a sample of a load voltage $V_{dc}$ and a comparator to find the difference between said product and said power supply voltage $V_{ac}$ and connected to drive the PFC transistor based on said difference obtained by the power factor correction circuit;

a ballast transistor controller connected to drive said pair of ballast transistors with an output signal at a first frequency and a second frequency and at frequencies that are modulated to maintain a particular magnitude of current in said load network;

a timing circuit connected to alternate said output signal between said first and second frequencies and having an input control to adjust the duration of said first operating frequency, wherein a sufficient duration of filament heating occurs before and during an application of a high voltage to start and maximize the life of said gaseous discharge lamp; and an over-temperature shutdown circuit having a temperature sensor integrated into and a part of the thermal mass of an IC that includes the power factor correction circuit and providing for a disabling of said pair of ballast transistors whenever the heat that has soaked into the IC has exceeded a first limit as sensed by said temperature sensor.

7. The IC of claim 6, further including:

a dimming circuit connected to vary the current through said load network according to a dimming control signal by adjusting the frequency of said output signal.

8. An integrated circuit (IC) for controlling a power factor correction (PFC) transistor and driving a pair of ballast transistors connected to a load network including a gaseous discharge lamp operable at a first pulse-width modulated pulse width to cause filament heating in said gaseous discharge lamp and at a second pulse-width modulated pulse width to generate ionizing voltages in said gaseous discharge lamp, the IC comprising:

a power supply voltage sampling input connected to receive a sample voltage $V_{ac}$ that represents the magnitude of voltage being delivered from a power supply source;

a power supply current sampling input connected to receive a sample current $i_{ac}$ that represents the magnitude of current being delivered from said power supply source;

a power factor correction circuit connected to the supply voltage sampling input and supply current sampling input and having a multiplier providing for an output of a product of a sample of a load voltage $V_{dc}$ and said $i_{ac}$ and a comparator for outputting a signal representing a difference between said product and said voltage $V_{ac}$;

a power factor correction output drive connected to the gate of said PFC transistor whose drain is connected to a boost inductor which is placed between said power supply source and said load network and which is responsive to said difference signal received from the power factor correction circuit;

at least one ballast transistor output drive each providing for a correction to a ballast transistor in said load network and having an output signal at said first and second pulse-width modulated pulse widths and a modulated duty cycle for controlling a level of current flowing through said load network; and a timing circuit connected to alternate said output signal between said first and second pulse-width modulated pulse widths and having an input control to adjust the duration of time said first operating pulse-width modulated pulse width is initially engaged before proceeding to said second operating pulse-width modulated pulse width, wherein a time sufficient to promote filament heating will elapse before and during an application of a high voltage for starting and maximizing the operating life of said gaseous discharge lamp.

9. The IC of claim 8, further including:

an over-temperature shutdown circuit connected to the ballast transistor output drive and having a temperature sensor integrated into and a part of the thermal mass of said IC and providing for a disabling of said ballast transistors whenever the heat that has soaked into the IC has exceeded a first limit as sensed by said temperature sensor.

10. The IC of claim 8, further including:

a dimming circuit connected to the ballast transistor output drive for varying the current through said load network by adjusting the duty cycle of said output signal according to an externally received dimming control signal.

11. The IC of claim 8, further including:

an oscillator including first and second pulse-width modulated pulse width generation means connected to the ballast transistor output drive for generating said first and second pulse-width modulated pulse widths.

12. An integrated circuit (IC) for controlling a power factor correction (PFC) transistor and driving a pair of ballast transistors connected to a load network including a gaseous discharge lamp at a first pulse-width modulated pulse width to cause a filament heating and at a second pulse-width modulated pulse width to generate ionizing voltages in said gaseous discharge lamp, the IC comprising:

an over-temperature shutdown circuit having a temperature sensor integrated into and made an intrinsic part of the thermal mass of said IC and providing for a disabling of said ballast transistors whenever the heat that has soaked into the IC has exceeded a first limit as sensed by said temperature sensor.

13. A boost converter for operating a gaseous discharge lamp, comprising:

a load network including a gaseous discharge lamp and configured such that the application of power at a first pulse-width modulated pulse width will cause a filament heating in said gaseous discharge lamp and the application of power at a second pulse-width modulated pulse width will generate ionizing voltages in said gaseous discharge lamp;

a power factor correction (PFC) transistor connected to a boost transformer in series between a power supply source and the load network;

a pair of ballast transistors connected to switch power to said load network;

a power factor correction circuit connected to sample said power supply voltage ($V_{ac}$) and to sample said power supply current ($i_{ac}$) and having a multiplier to find a product of said sample $i_{ac}$ and a sample of a load voltage $V_{dc}$ and a comparator to find the difference between said product and said sample voltage $V_{ac}$ and connected to drive the PFC transistor based on said difference obtained by the power factor correction circuit;

a ballast transistor controller connected to drive said pair of ballast transistors with an output signal at a first pulse-width modulated pulse width and a second pulse-width modulated pulse width and at duty cycles that are modulated to maintain a particular magnitude of current in said load network;

a timing circuit connected to alternate said output signal between said first and second pulse-width modulated pulse widths and having an input control to adjust the duration of said first operating pulse-width modulated pulse width, wherein a sufficient duration of filament heating occurs before and during an application of a high voltage to start and maximize the life of said gaseous discharge lamp; and an over-temperature shutdown circuit having a temperature sensor integrated into and a part of the thermal mass of an IC that includes the power factor correction circuit and providing for a disabling of said pair of ballast transistors whenever the heat that has soaked into the IC has exceeded a first limit as sensed by said temperature sensor.

14. The IC of claim 13, further including:

a dimming circuit connected to vary the current through said load network according to a dimming control signal by adjusting the duty cycle of said output signal.

15. The IC of claim 1, further including:

a mode control means connected to a mode control pin for switching the IC between variable frequency and variable pulse width operational modes.

16. The IC of claim 8, further including:

a mode control means connected to a mode control pin for switching the IC between variable frequency and variable pulse width operational modes.

* * * * *